US006380988B1

United States Patent
Sung

(10) Patent No.: US 6,380,988 B1
(45) Date of Patent: Apr. 30, 2002

(54) FOCUS COMPENSATION APPARATUS AND METHOD FOR MONITOR SYSTEM

(75) Inventor: Kang Jae Sung, Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/525,559

(22) Filed: Mar. 15, 2000

(30) Foreign Application Priority Data

Mar. 16, 1999 (KR) .............................................. 99-8766
Dec. 10, 1999 (KR) ............................................ 99-56567

(51) Int. Cl.[7] .............................................. H04N 3/22
(52) U.S. Cl. ....................... 348/745; 348/747; 348/806; 315/368.18
(58) Field of Search ................................. 348/745, 746, 348/747, 806, 807, 190, 191, 678, 679, 673; 315/368.11, 368.18

(56) References Cited

U.S. PATENT DOCUMENTS

| | | | |
|---|---|---|---|
| 4,701,788 A | 10/1987 | Desjardins | 358/64 |
| 4,916,365 A | 4/1990 | Arai | 315/383 |
| 5,298,985 A | 3/1994 | Tsujihara et al. | 348/745 |
| 5,519,447 A | 5/1996 | Shima et al. | 348/556 |
| 5,523,657 A | 6/1996 | Kamei | 315/368.18 |
| 5,532,765 A | 7/1996 | Inoue et al. | 348/807 |
| 5,576,774 A | 11/1996 | Hosoi et al. | 348/745 |
| 5,831,400 A * | 11/1998 | Kim | 348/806 |
| 5,847,777 A | 12/1998 | George | 348/746 |
| 5,886,750 A | 3/1999 | Osuga et al. | 348/615 |
| 5,923,387 A * | 7/1999 | Van der Sanden | 348/806 |
| 5,965,990 A * | 10/1999 | Woo | 348/806 |
| 5,966,177 A * | 10/1999 | Harding | 348/806 |
| 6,078,151 A * | 6/2000 | Kudo | 348/806 |
| 6,100,920 A * | 8/2000 | Miller et al. | 348/68 |
| 6,151,082 A * | 11/2000 | Kim | 348/806 |
| 6,160,592 A * | 12/2000 | Yoon | 348/806 |

FOREIGN PATENT DOCUMENTS

JP         6233152         1/2001

* cited by examiner

Primary Examiner—Michael Lee
Assistant Examiner—Trang U. Tran
(74) Attorney, Agent, or Firm—Mills & Onello, LLP

(57) ABSTRACT

A focus compensation apparatus and method for a monitor system are provided. The focus compensation apparatus includes a parabolic signal generation circuit for generating a parabolic signal in synchronization with a horizontal flyback pulse, the waveform of the parabolic signal varying in response to first and second control signals. A video signal focus compensator adjusts the gain of an input video signal such that the gain increases from the center of the monitor screen toward the edge of the monitor screen in response to the parabolic signal. The focus compensator outputs a gain-adjusted video signal as a focus-compensated video signal. According to the focus compensation apparatus, the gain of an input video signal is adjusted using a parabolic signal, the level of which increases from the center of a monitor screen toward the edge of the monitor screen, thereby preventing a picture from being out of focus and blurred at the edge of the monitor screen. In addition, the waveform of the parabolic signal is automatically varied by a parabolic signal generation circuit while the gain of the input video signal is being adjusted to adjust contrast or auxiliary contrast, thereby effectively performing focus compensation at the edge of the monitor screen.

17 Claims, 9 Drawing Sheets

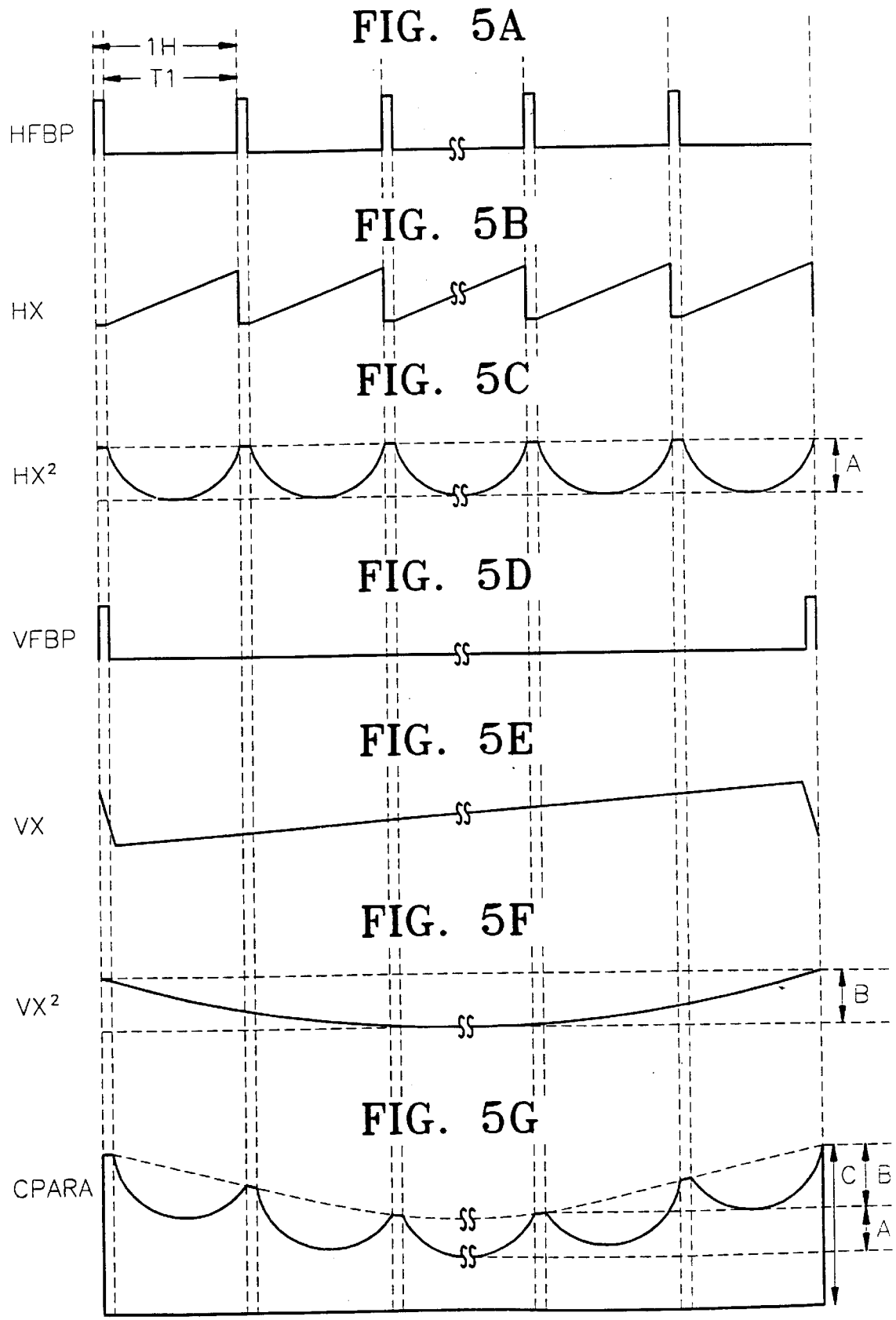

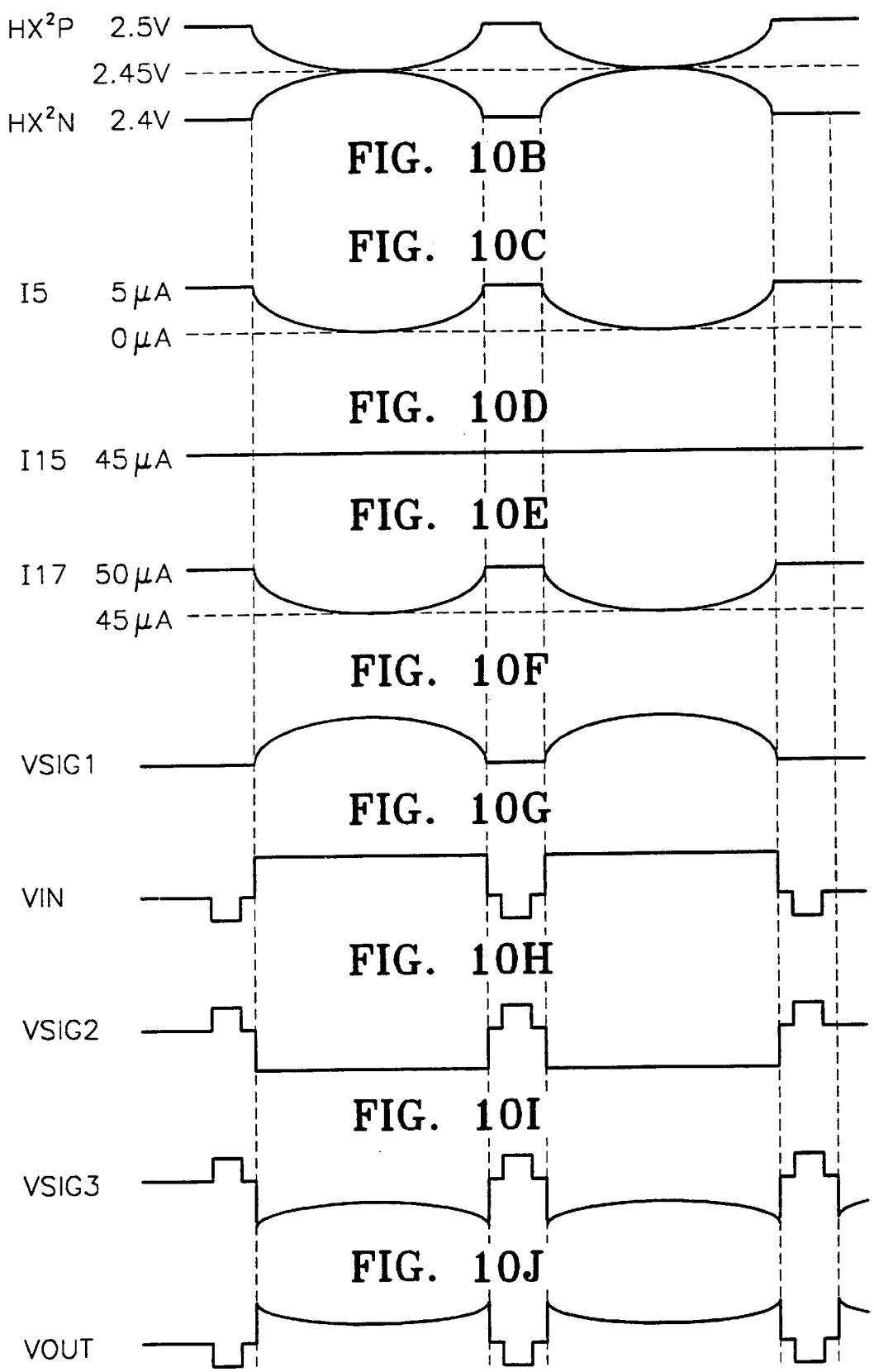

FOCUS COMPENSATION APPARATUS AND METHOD FOR MONITOR SYSTEM

BACKGROUND OF THE INVENTION

1. Field of the Invention

The present invention relates to a monitor system, and more particularly, to a focus compensation apparatus and method for performing focus compensation at the edge of the screen of a monitor system.

2. Description of the Related Art

A video signal is clamped to a black level voltage which is a constant direct current (DC) voltage representing the brightness of a picture, and the clamped video signal is scanned to the screen of a monitor through an electron gun. A contrast adjustor is provided in the monitor so that a user can adjust the contrast of a picture. When the contrast of a picture is adjusted by the user, focus compensation in accordance with the contrast adjustment may be needed.

As the size of the screen of a monitor becomes larger, the surface of the screen tends to become more aspheric, that is, flat. FIG. 1 is a schematic diagram showing a picture tube of a monitor as an example.

Referring to FIG. 1, an electron gun 110 receives a video signal VOUT, generates an electron beam, and controls the intensity of the electron beam to reproduce a picture on a screen 130. As shown in FIG. 1, when the screen 130 has an aspheric surface, the distances from the electron gun 110 to different portions of the screen 130 may be different. For example, the distance I1 or I3 between the electron gun 110 and the edges M of the screen 130 may be longer than the distance I2 between the electron gun 110 and the center N of the screen 130. In this case, a picture may be out of focus and more blurred at the edge of the screen 130 than at the center of the screen 130. A phenomenon in which a picture is out of focus at the edge of a screen can be eliminated by transforming a video signal into a parabolic format.

FIG. 2A is a diagram showing a video signal after the video signal, which corresponds to a single scanning line, is transformed into a parabolic format. FIG. 2B is a diagram showing the video signal corresponding to a single scanning line before it is transformed into a parabolic format.

Referring to FIGS. 1 through 2B, in a case in which the level of a video signal at the center N is equal to the level of the signal at the edge M as shown in FIG. 2B, the video signal is scanned to the center N and the edge M of the screen 130 at the same level. Since the edge M is farther from the electron gun 110 than the center N of the screen 130, the level of the scanned video signal appears lower at the edge M of the screen 130 than at the center N of the screen 130. Accordingly, even though a picture is in focus at the center N of the screen 130, the picture is gradually blurred from the center N toward the edge M.

In a case in which a video signal has a parabolic format in which the level of the video signal gradually increases from the center N toward the edge M as shown in FIG. 2A, the level of the video signal scanned to the edge M, which is farther than the center N from the electron gun 110, is higher than the level of the video signal scanned to the center N. In other words, a drop in the level of the video signal scanned to the edge M of the screen 130 due to the difference between the distances from the electron gun 110 to the edge M and to the center N of the screen 130, is compensated for. Accordingly, a picture can be in focus at the edge M of the screen 130 as well as at the center N of the screen 130.

When transforming a video signal into a parabolic format as shown in FIG. 2A, it is important to set a parabolic signal level P to an appropriate value. In other words, a ratio of the parabolic signal level P and a video signal level Q must be appropriately set to make a picture in focus at the edge M of the screen 130. For example, assuming that the focus of a picture is effectively adjusted at the edge of a screen when the parabolic signal level P is 10% of the video signal level Q, the ratio of the parabolic signal level P to the video signal level Q must not be changed even when the video signal level Q is changed by a user externally operating the monitor system. In other words, when a user changes the contrast so that the video signal level Q is changed, the parabolic signal level P must also be changed to maintain the ratio of the parabolic signal level P to the video signal level Q at 10%.

Conventionally, a parabolic signal is generated by an externally provided separate chip. When a parabolic signal is generated by an external chip, adjustment of contrast by a user and generation of a parabolic signal according to the contrast adjustment are separately performed. That is, in such a system, when a user varies contrast, the parabolic signal level P is not automatically varied. Accordingly, additional operation is needed for varying the parabolic signal level P in response to the variation of the video signal level Q so as to maintain a predetermined ratio of the parabolic signal level P to the video signal level Q. As described above, since contrast adjustment and focus compensation are separately performed when a parabolic signal is generated by an external chip, an operation for adjusting the focus at the edge of a screen is difficult, and a circuit used to perform the adjustment may be complex and, therefore, expensive.

SUMMARY OF THE INVENTION

To solve the above problems, it is a first objective of the present invention to provide a focus compensation apparatus for efficient focus compensation at the edge of the screen of a monitor.

It is a second objective of the present invention to provide a focus compensation method for efficient focus compensation at the edge of the screen of a monitor.

It is a third objective of the present invention to provide a parabolic signal generator used in the focus compensation apparatus, for generating a parabolic signal, the waveform of which can be varied.

Accordingly, in one aspect, the invention is directed to a focus compensation apparatus for adjusting a focus at the edge of a monitor screen in a monitor system. The focus compensation apparatus includes a parabolic signal generation circuit for generating a parabolic signal in synchronization with a horizontal flyback pulse, the waveform of the parabolic signal varying in response to first and second control signals. The focus compensation apparatus also includes a video signal focus compensator for adjusting the gain of an input video signal such that the gain increases from the center of the monitor screen toward the edge of the monitor screen in response to the parabolic signal, and for outputting a gain adjusted video signal as a focus-compensated video signal.

In one embodiment, the first control signal is an auxiliary contrast control signal for achieving white balance by adjusting the contrast of red, green and blue signals which constitute the input video signal. The video signal focus compensator can adjust the contrast of the focus-compensated video signal in response to a contrast control signal.

In another embodiment, the first control signal is a contrast control signal for adjusting the contrast of the input video signal. The video signal focus compensator can adjust the contrast of red, green and blue signals constituting the focus-compensated video signal in response to an auxiliary contrast control signal.

The parabolic signal generation circuit can include a first level adjustor, a horizontal parabolic signal generator, and a parabolic signal synthesizer. The first level adjustor generates a first signal having a level corresponding to the first control signal. The horizontal parabolic signal generator generates a horizontal parabolic signal in synchronization with the horizontal flyback pulse, wherein the waveform of the horizontal parabolic signal varies in response to the first signal and the second control signal. The parabolic signal synthesizer synthesizes the first signal and the horizontal parabolic signal and generates a synthesized result as the parabolic signal for controlling the input video signal, such that the gain of the input video signal increases from the center toward the edge of the monitor screen. In one embodiment, the horizontal parabolic signal generator includes (i) a first sawtooth generator for receiving the horizontal flyback pulse and generating a first sawtooth signal synchronized with the horizontal flyback pulse, (ii) a first multiplier for receiving the first sawtooth signal and squaring a linear section of the first sawtooth signal to generate a squared signal as a first square signal, (iii) a second level adjustor for receiving the first signal, adjusting the level of the first signal in response to the second control signal, and generating a level-adjusted first signal as a second signal, and (iv) a first parabolic amplitude adjustor for receiving the first square signal, controlling the amplitude of the first square signal to be the level of the second signal, and generating an amplitude-controlled signal as the horizontal parabolic signal.

In one embodiment, the parabolic signal generation circuit can also include a vertical parabolic signal generator for generating a vertical parabolic signal in synchronization with a vertical flyback pulse, the waveform of the vertical parabolic signal varying in response to the first signal and a third control signal. The parabolic signal synthesizer synthesizes the first signal, the horizontal parabolic signal and the vertical parabolic signal and generates a synthesized result as the parabolic signal. The vertical parabolic signal generator can include (i) a second sawtooth generator for receiving the vertical flyback pulse and generating a second sawtooth signal synchronized with the vertical flyback pulse, (ii) a second multiplier for receiving the second sawtooth signal and squaring a linear section of the second sawtooth signal to generate a squared signal as a second square signal, (iii) a third level adjustor for receiving the first signal, adjusting the level of the first signal in response to the third control signal, and generating a level-adjusted first signal as a third signal, and (iv) a second parabolic amplitude adjustor for receiving the second square signal, controlling the amplitude of the second square signal to be the level of the third signal, and generating an amplitude-controlled signal as the horizontal parabolic signal.

In another aspect, the invention is directed to a focus compensation method for adjusting focus at the edge of a monitor screen in a monitor system. The focus compensation method includes the steps of (a) generating a first signal having a level corresponding to a first control signal, (b) generating a horizontal parabolic signal in synchronization with a horizontal flyback pulse, the waveform of the horizontal parabolic signal varying in response to the first signal and a second control signal, (c) synthesizing the first signal and the horizontal parabolic signal to generate a parabolic signal, the level of the parabolic signal increasing from the center of the monitor screen toward the edge of the monitor screen, and (d) performing focus compensation such that the gain of the input video signal increases from the center of the monitor screen toward the edge of the monitor screen by adjusting the gain of the input video signal according to the parabolic signal.

In one embodiment, the first control signal is an auxiliary contrast control signal for achieving white balance by adjusting the contrast of red, green and blue signals constituting the input video signal. In another embodiment, the first control signal is a contrast control signal for adjusting the contrast of the input video signal.

In one embodiment, the step of generating a horizontal parabolic signal in synchronization with a horizontal flyback pulse includes (i) generating a first sawtooth signal synchronized with the horizontal flyback pulse, (ii) generating a first square signal by squaring a linear section of the first sawtooth signal, (iii) adjusting the level of the first signal according to the second control signal and generating a level-adjusted first signal as a second signal, and (iv) controlling the amplitude of the first square signal to be the level of the second signal and generating an amplitude-controlled signal as the horizontal parabolic signal.

In one embodiment, the method of the invention further includes generating a vertical parabolic signal in synchronization with a vertical flyback pulse after generating a horizontal parabolic signal in synchronization with a horizontal flyback pulse, wherein the waveform of the vertical parabolic signal varies in response to the first signal and a third control signal. Also, the step of synthesizing the first signal and the horizontal parabolic signal to generate a parabolic signal can include (i) synthesizing the first signal, the horizontal parabolic signal and the vertical parabolic signal and (ii) generating a synthesized result as the parabolic signal. The step of generating a vertical parabolic signal in synchronization with a vertical flyback pulse after generating a horizontal parabolic signal in synchronization with a horizontal flyback pulse can include (i) generating a second sawtooth signal synchronized with the vertical flyback pulse, (ii) generating a second square signal by squaring a linear section of the second sawtooth signal, (iii) adjusting the level of the first signal according to the third control signal and generating a level-adjusted first signal as a third signal, and (iv) controlling the amplitude of the second square signal to be the level of the third signal and generating an amplitude-controlled signal as the vertical parabolic signal.

In another aspect, the invention is directed to a parabolic signal generator used in a focus compensation apparatus. The parabolic signal generator includes a sawtooth generator, a multiplier, a level adjustor, a parabolic amplitude adjustor and a parabolic signal synthesizer. The sawtooth generator is for receiving a pulse signal and generating a sawtooth signal synchronized with the pulse signal. The multiplier receives the sawtooth signal and squares a linear section of the sawtooth signal to generate a square signal. The level adjustor receives a first signal having a level corresponding to a first control signal, adjusts the level of the first signal in response to a second control signal, and generates a level-adjusted first signal as a second signal. The parabolic amplitude adjustor receives the square signal and performs amplitude control such that the level of the second signal is equal to the amplitude of the square signal to generate an amplitude-controlled square signal. The parabolic signal synthesizer synthesizes the first signal and the amplitude-controlled square signal and generates a synthesized signal as a parabolic signal.

In one embodiment, the first control signal is an auxiliary contrast control signal for achieving white balance by adjusting the contrast of red, green and blue signals constituting the input video signal. In another embodiment, the first control signal is a contrast control signal for adjusting the contrast of the input video signal.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 5A through 5G are waveform diagrams of selected signals of the parabolic signal generation circuit of FIG. 4.

FIGS. 9A through 9G are diagrams illustrating the states of current and voltage which are controlled in response to first and second control signals in the level adjustors of FIG. 8.

FIGS. 10A through 10J are waveform diagrams of selected signals of the parabolic amplitude adjustor, parabolic signal synthesizer and video signal focus compensator of FIG. 8.

DETAILED DESCRIPTION OF PREFERRED EMBODIMENTS OF THE INVENTION

Figure 1:
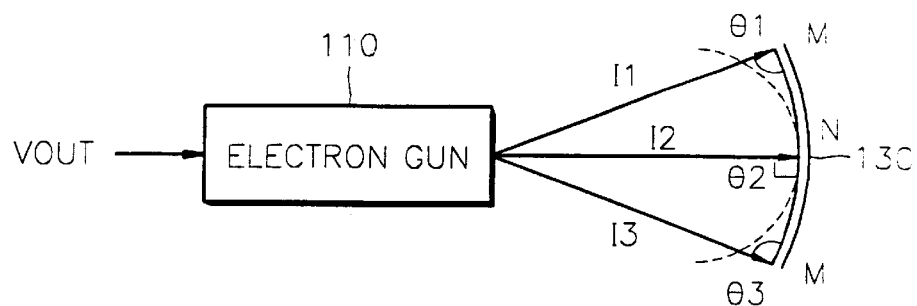
FIG. 1 is a schematic diagram of a picture tube.
Figure 2A:
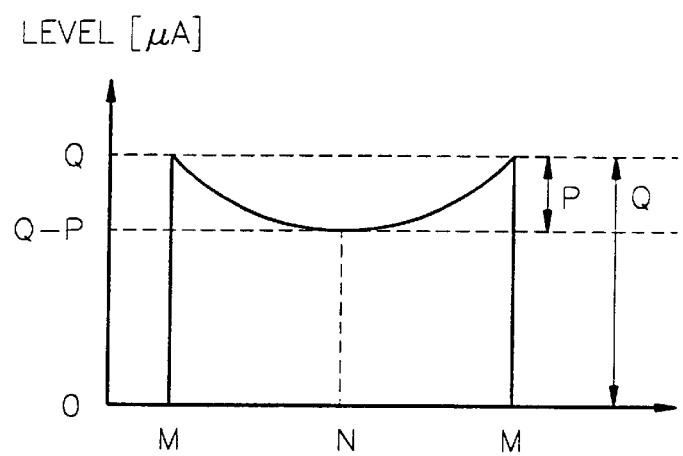
FIGS. 2A and 2B are diagrams showing a video signal after and before the video signal corresponding to a single scanning line is transformed into a parabolic format, respectively.
Figure 2B:
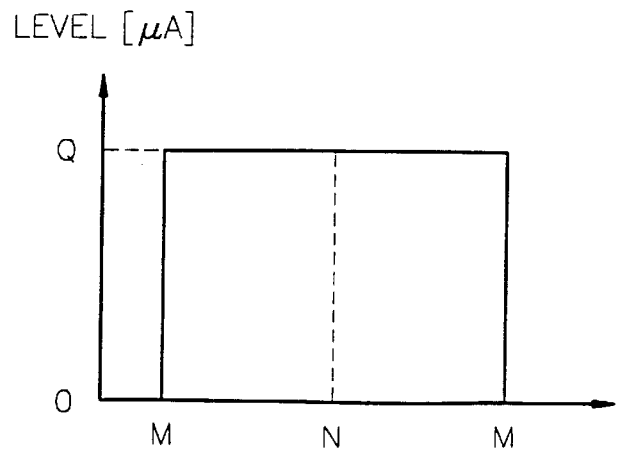
Figure 3:
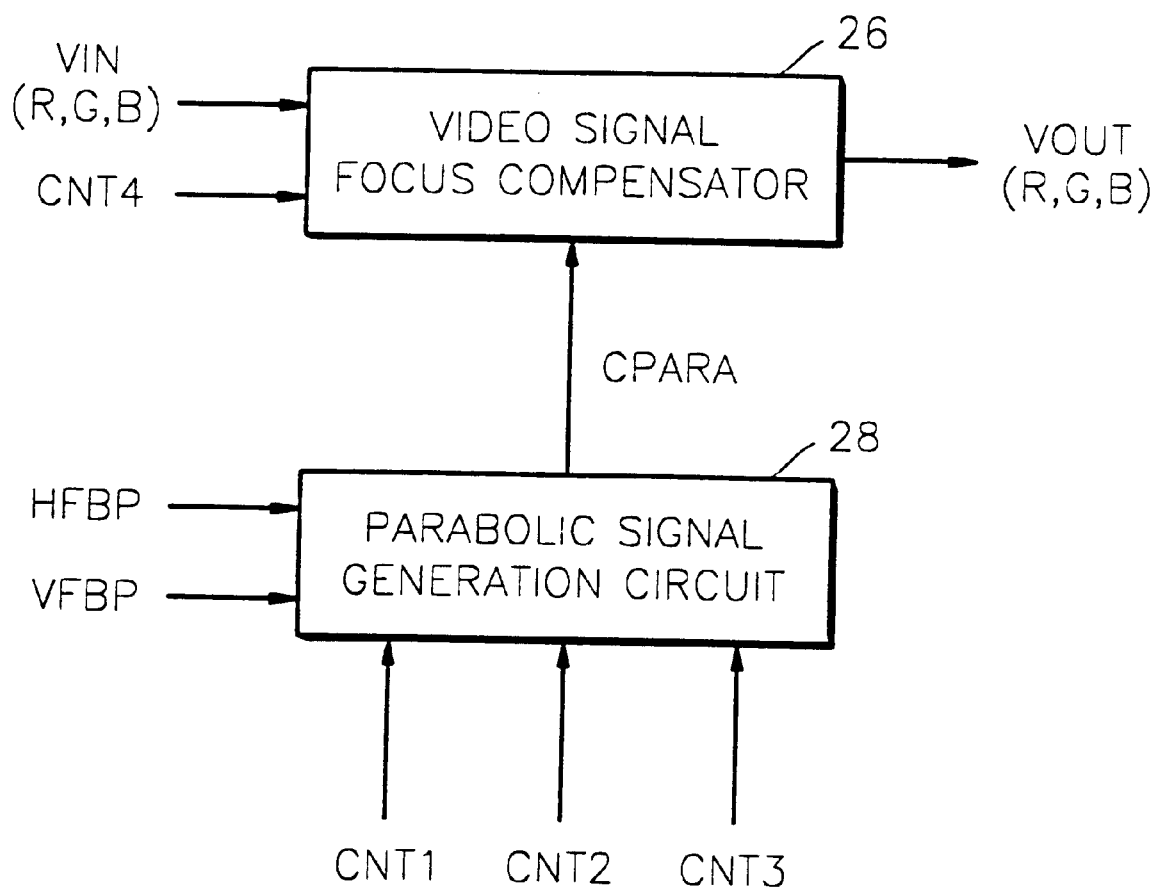
FIG. 3 is a schematic block diagram of a focus compensation apparatus according to an embodiment of the present invention.

Referring to FIG. 3, a focus compensation apparatus according to one embodiment of the present invention includes a video signal focus compensator 26 and a parabolic signal generation circuit 28. In FIG. 3, an input video signal VIN is composed of a red (R), green (G) and blue (B) color signals.

The parabolic signal generation circuit 28 receives a horizontal flyback pulse HFBP and a vertical flyback pulse VFBP and generates a parabolic signal CPARA having a variable waveform in response to first, second and third control signals CNT1, CNT2 and CNT3. The first through third control signals CNT1–CNT3 are control signals for controlling the level of the parabolic signal CPARA. Moreover, one of the three control signals CNT1–CNT3 may be a contrast control signal or an auxiliary contrast control signal for adjusting the contrast of a picture on a monitor screen. The contrast control signal and the auxiliary contrast control signal are described below in detail.

The video signal focus compensator 26 adjusts the gain of the input video signal VIN by mixing the parabolic signal CPARA and the input video signal VIN. Then, the video signal focus compensator 26 outputs the gain-adjusted and focus-compensated video signal through an output terminal VOUT. The video signal focus compensator 26 can also vary the level of the focus-compensated video signal in response to a fourth control signal CNT4. The fourth control signal CNT4 may be a contrast control signal or an auxiliary contrast control signal for adjusting the contrast of a picture on a monitor screen.

That is, in the focus compensation apparatus of FIG. 3, the input video signal VIN is controlled to have a gain increasing from the center of the monitor screen toward the edge of the monitor screen according to the parabolic signal CPARA, the waveform of which varies in response to the first through third control signals CNT1–CNT3. Accordingly, a phenomenon in which a picture is out of focus at the edge of a monitor screen can be prevented. In addition, one of the first through third control signals CNT1–CNT3 may be a contrast control signal for controlling contrast or an auxiliary contrast control signal for achieving white balance. Consequently, as the level of the input video signal VIN is adjusted according to the contrast control signal or the auxiliary contrast control signal, the waveform of the parabolic signal CPARA can be adaptively varied.

Figure 4:
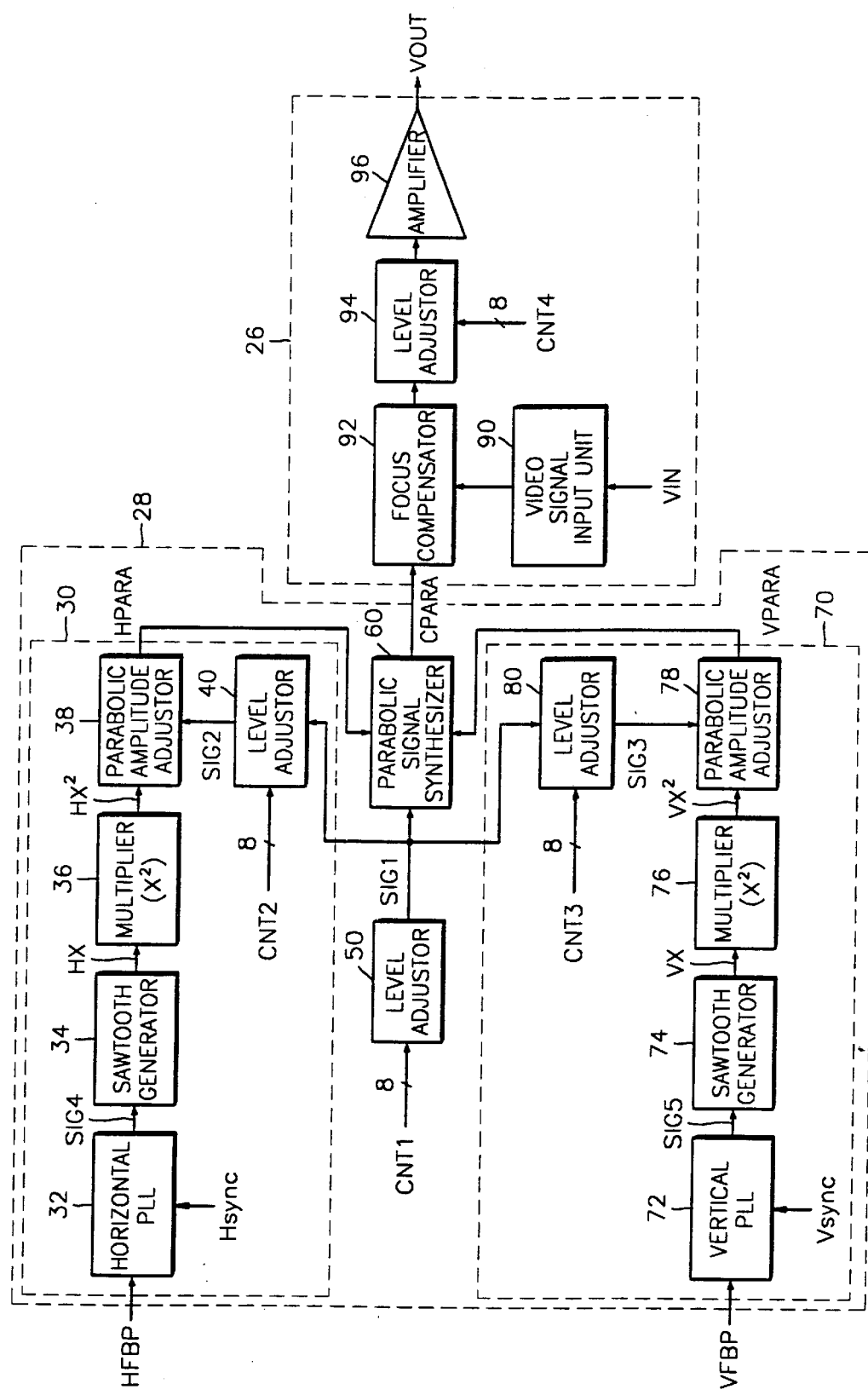
FIG. 4 is a detailed schematic block diagram of the focus compensation apparatus of FIG. 3.

FIG. 4 is a block diagram showing the focus compensation apparatus of FIG. 3 in detail. The parabolic signal generation circuit 28 of the focus compensation apparatus includes a level adjustor 50, a horizontal parabolic signal generator 30, a vertical parabolic signal generator 70 and a parabolic signal synthesizer 60. The horizontal parabolic signal generator 30 includes a sawtooth generator 34, a multiplier 36, a parabolic amplitude adjustor 38 and a level adjustor 40. The horizontal parabolic signal generator 30 may also include a horizontal phase-locked loop (PLL) 32. The vertical parabolic signal generator 70 includes a sawtooth generator 74, a multiplier 76, a parabolic amplitude adjustor 78 and a level adjustor 80. The vertical parabolic signal generator 70 may also include a vertical PLL 72. The video signal focus compensator 26 includes a video signal input unit 90, a focus compensator 92 and an amplifier 96. The video signal focus compensator 26 also includes a level adjustor 94 between the focus compensator 92 and the amplifier 96 to adjust the level of a focus-compensated video signal generated by the focus compensator 92 in response to the fourth control signal CNT4. In one particular exemplary embodiment, in the focus compensation apparatus of FIG. 4, each of the first through fourth control signals CNT1–CNT4 is 8-bit digital data, and will be described herein as such. However, it will be understood that 8-bit data is used for ease of illustration only, and other forms of data can be used.

FIGS. 5A through 5G are sample waveform diagrams of selected signals of the parabolic signal generation circuit 28 of FIG. 4. FIG. 5A shows the horizontal flyback pulse HFBP which is an input signal of the horizontal parabolic signal generator 30. FIG. 5B shows a first sawtooth signal HX which is the output signal of the sawtooth generator 34. FIG. 5C shows a first square signal $HX^2$ which is the output signal of the multiplier 36. FIG. 5D shows the vertical flyback pulse VFBP which is an input signal of the vertical parabolic signal generator 70. FIG. 5E shows a second sawtooth signal VX which is the output signal of the sawtooth generator 74.

FIG. 5F shows a second square signal $VX^2$ which is the output signal of the multiplier 76. FIG. 5G shows the parabolic signal CPARA which is the output signal of the parabolic signal synthesizer 60.

Figure 6A:
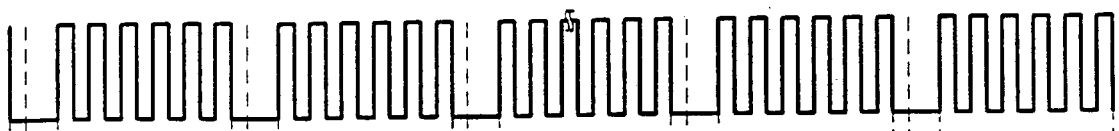
FIGS. 6A and 6B are waveform diagrams of selected signals of the video signal focus compensator of FIG. 4.
Figure 6B:
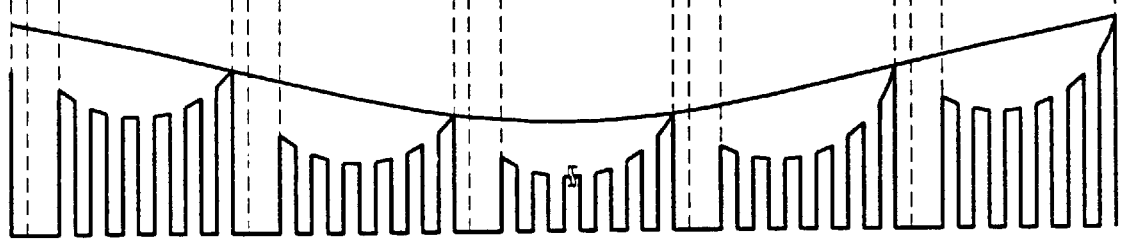

FIGS. 6A and 6B are sample waveform diagrams of selected signals of the video signal focus compensator 26 of FIG. 4. FIG. 6A shows the input video signal VIN and FIG. 6B shows a focus-compensated video signal.

Figure 7:
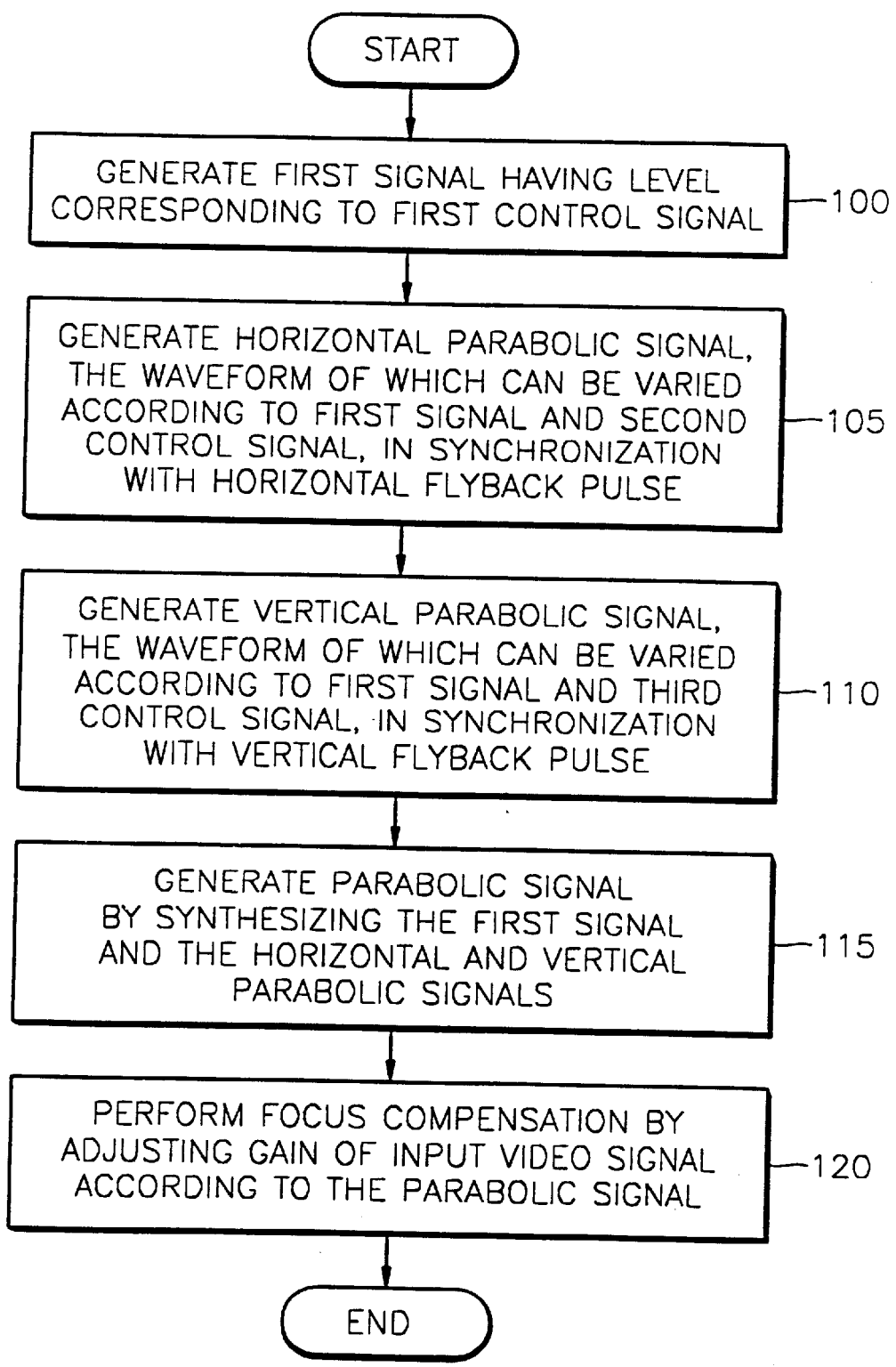
FIG. 7 is a flowchart illustrating one embodiment of a focus compensation method which can be performed by the apparatus of FIG. 4.

FIG. 7 is a flowchart illustrating steps of one embodiment of a focus compensation method which can be performed by the apparatus of FIG. 4, in accordance with the invention. The focus compensation method according FIG. 7 includes generating a first signal SIG1 (step 100), a horizontal parabolic signal HPARA (step 105) and a vertical parabolic signal VPARA (step 110) in response to the first through third control signals CNT1–CNT3; generating the parabolic signal CPARA (step 115); and performing focus compensation by adjusting the gain of the input video signal VIN according to the parabolic signal CPARA (step 120).

With reference to FIGS. 4 through 7, the focus compensation apparatus of FIG. 4 and the focus compensation method performed by the apparatus of FIG. 4 will be described in detail.

In FIG. 4, the level adjustor 50 generates the first signal SIG1 having a current level corresponding to the 8-bit first control signal CNT1 and outputs the first signal SIG1 to the horizontal parabolic signal generator 30, the vertical parabolic signal generator 70 and the parabolic signal synthesizer 60 in the step 100. For the first control signal CNT1, a contrast control signal for adjusting the contrast of a picture on a monitor screen by adjusting the gain of the input video signal VIN may be used. Alternatively, an auxiliary contrast control signal for achieving white balance by adjusting the gains of the red (R), green (G) and blue (B) color signals constituting the input video signal VIN may be used for the first control signal SIG1.

Generally, R, G and B color signals are individually processed in a monitor system. The gains of the R, G and B color signals are simultaneously adjusted in response to a contrast control signal. The contrast control signal is also used when the contrast on the monitor screen is adjusted according to the input by a user.

An auxiliary contrast control signal is used for achieving the white balance of a monitor system by adjusting the gains of R, G and B color signals. A well achieved white balance (color balance) in the monitor system means that a white signal W is smoothly generated. It is preferable that the R, G and B signals have the same gain in the monitor system to generate an ideal white signal W. However, due to errors occurring in manufacture, the gains of the R, G and B signals obtained after signal processing may be different. When the gains of the R, G and B signals are different, the auxiliary contrast control signal is used for compensating for errors among the gains of the R, G and B signals, thereby achieving ideal white balance.

For example, it is assumed that a white signal W generated in a monitor system can be expressed as:

$$W=1R+0.99G+0.95B,$$

wherein the gains of the R, G and B signals are different. In this case, an auxiliary contrast control signal is used to adjust the gains of the G and B signals to 1, thereby achieving ideal white balance. Such white balance is achieved during the manufacture of monitors in factories.

Subsequently, in step 105, the horizontal parabolic signal generator 30 generates the horizontal parabolic signal HPARA, the waveform of which can be varied in response to the first signal SIG1 and the first control signal CNT1, in synchronization with the horizontal flyback pulse HFBP shown in FIG. 5A.

More specifically, the horizontal PLL 32 synchronizes the horizontal flyback pulse HFBP shown in FIG. 5A with a horizontal synchronizing signal Hsync and generates a synchronized horizontal flyback pulse SIG4. Accordingly, the horizontal parabolic signal HPARA can accurately be parabolic in data section T1, regardless of noise which may be contained in the horizontal flyback pulse HFBP. The frequency of the horizontal flyback pulse HFBP can vary from 25 KHz to 100 KHz according to the type of monitor system.

The sawtooth generator 34 receives the synchronized horizontal flyback pulse SIG4 and generates the first sawtooth signal HX which is a linear function as shown in FIG. 5B. The multiplier 36 receives the first sawtooth signal HX and squares the linear section of the first sawtooth signal HX to generate the first square signal $HX^2$ as shown in FIG. 5C.

The level adjustor 40 receives the first signal SIG1 and adjusts the level of the first signal SIG1 to a level adjustment ratio corresponding to the second control signal CNT2. According to the characteristics of a monitor system, the level adjustment ratio is set to 0–15%. For example, when the level of the first signal SIG1 is 50 $\mu A$ and the level adjustment ratio corresponding to the second control signal CNT2 is 10%, the level of the second signal SIG2 is 5 $\mu A$ which is 10% of the first signal SIG1.

The parabolic amplitude adjustor 38 receives the first square signal $HX^2$ as shown in FIG. 5C and controls the amplitude A of the first square signal $HX^2$ to be equal to the level of the second signal SIG2. The parabolic amplitude adjustor 38 also generates an amplitude-controlled first square signal as the horizontal parabolic signal HPARA. Consequently, the amplitude of the horizontal parabolic signal HPARA is adjusted to be 0–15% of the first signal SIG1 in response to the second control signal CNT2.

As described above, the horizontal parabolic signal HPARA, the level of which is higher at the edge thereof than at the center thereof and which is synchronized with the horizontal flyback pulse HFBP, is used for compensating a focus at the left and right edges of the monitor screen.

In step 110, the vertical parabolic signal generator 70 generates the vertical parabolic signal VPARA, the waveform of which can be varied according to the first signal SIG1 and the third control signal CNT3, in synchronization with the vertical flyback pulse VFBP. More specifically, the vertical PLL 72 synchronizes the vertical flyback signal VFBP with a vertical synchronizing signal Vsync and generates a synchronized vertical flyback pulse SIG5. Accordingly, the vertical parabolic signal VPARA synchronized with the vertical synchronizing signal Vsync can be generated regardless of noise which may be contained in the vertical flyback pulse VFBP. The frequency of the vertical flyback pulse VFBP can vary from 50 Hz to 100 Hz according to the type of monitor system. The sawtooth generator 74 receives the synchronized vertical flyback pulse SIG5 and generates the second sawtooth signal VX which is a linear function as shown in FIG. 5E.

The multiplier 76 receives the second sawtooth signal VX as shown in FIG. 5E and squares the linear section of the second sawtooth signal VX to generate the second square signal $VX^2$ as shown in FIG. 5F. The level adjustor 80 receives the first signal SIG1 generated by the level adjustor 50 and adjusts the level of the first signal SIG1 according to a level adjustment ratio corresponding to the third control signal CNT3. According to the characteristics of a monitor system, the level adjustment ratio is set to 0–15%. For example, when the level of the first signal SIG1 is 50 $\mu$A and the level adjustment ratio corresponding to the third control signal CNT3 is 10%, the level of the third signal SIG3 is 5 $\mu$A which is 10% of the first signal SIG1.

The parabolic amplitude adjustor 78 receives the second square signal $VX^2$ as shown in FIG. 5F and controls the amplitude B of the second square signal $VX^2$ to be equal to the level of the third signal SIG3. The parabolic amplitude adjustor 78 also generates an amplitude-controlled second square signal as the vertical parabolic signal VPARA. Consequently, the amplitude of the vertical parabolic signal VPARA is adjusted to be 0–15% of the first signal SIG1 in response to the third control signal CNT3.

As described above, the vertical parabolic signal VPARA, the level of which is higher at the edge thereof than at the center thereof and which is synchronized with the vertical flyback pulse VFBP, is used for compensating a focus at the upper and lower edges of the monitor screen.

Next, in step 115, the parabolic signal synthesizer 60 synthesizes the first signal SIG1, the vertical parabolic signal VPARA and the horizontal parabolic signal HPARA and outputs a synthesized result as the parabolic signal CPARA as shown in FIG. 5G. In FIG. 5G, the level C of the parabolic signal CPARA is the level of the first signal SIG1 determined according to the first control signal CNT1. The level A of the horizontal parabolic signal HPARA is obtained by adjusting the level of the first signal SIG1 to the level adjustment ratio corresponding to the second control signal CNT2. The level B of the vertical parabolic signal VPARA is obtained by adjusting the level of the first signal SIG1 to the level adjustment ratio corresponding to the third control signal CNT3. The second and third control signals CNT2 and CNT3 are preset to predetermined values according to the characteristic of the system. When the second and third control signals CNT2 and CNT3 are preset to the predetermined values according to the characteristics of the system, the level A of the horizontal parabolic signal HPARA and the level B of the vertical parabolic signal VPARA vary according to the first control signal CNT1. As described above, the first control signal CNT1 may be a contrast control signal or an auxiliary contrast control signal. Consequently, the parabolic signal CPARA compensates a focus at the upper, lower, right and left edges of the monitor screen while automatically varying the amplitudes of the horizontal and vertical parabolic signals HPARA and VPARA in response to contrast adjustment or auxiliary contrast adjustment.

Finally, in step 120, the video signal focus compensator 26 adjusts the gain of the input video signal VIN according to the parabolic signal CPARA and outputs a gain-adjusted video signal as a focus-compensated video signal through an output terminal VOUT.

More specifically, the video signal input unit 90 of the video signal focus compensator 26 receives the input video signal VIN as shown in FIG. 6A and clamps the input video signal VIN using a black level as a reference value. The focus compensator 92 adjusts the gain of the input video signal clamped by the video signal input unit 90 in response to the parabolic signal CPARA and outputs the gain-adjusted video signal as the focus-compensated video signal as shown in FIG. 6B. In other words, the gain of the input video signal VIN is adjusted using the parabolic signal CPARA which increases the gain from the center of the monitor screen toward the edge of the monitor screen as shown in FIG. 5G. The amplifier 96 amplifies the focus-compensated video signal output from the focus compensator 92 and outputs a result of the amplification through the output terminal VOUT.

The video signal focus compensator 26 may also include the level adjustor 94 for adjusting the level of the focus-compensated video signal in response to the fourth control signal CNT4. The fourth control signal CNT4 may be a contrast control signal or an auxiliary contrast control signal like the first control signal CNT1. When the first control signal CNT1 is the contrast control signal, the fourth control signal CNT4 is the auxiliary contrast control signal. Alternatively, when the first control signal CNT1 is the auxiliary contrast control signal, the fourth control signal CNT4 is the contrast control signal.

In this specification, the horizontal parabolic signal HPARA and the vertical parabolic signal VPARA are used together for focus compensation at the edge of a monitor screen according to contrast adjustment and auxiliary contrast adjustment. However, focus compensation at the edge of a monitor screen can be substantially achieved by using only the horizontal parabolic signal HPARA.

Figure 8:
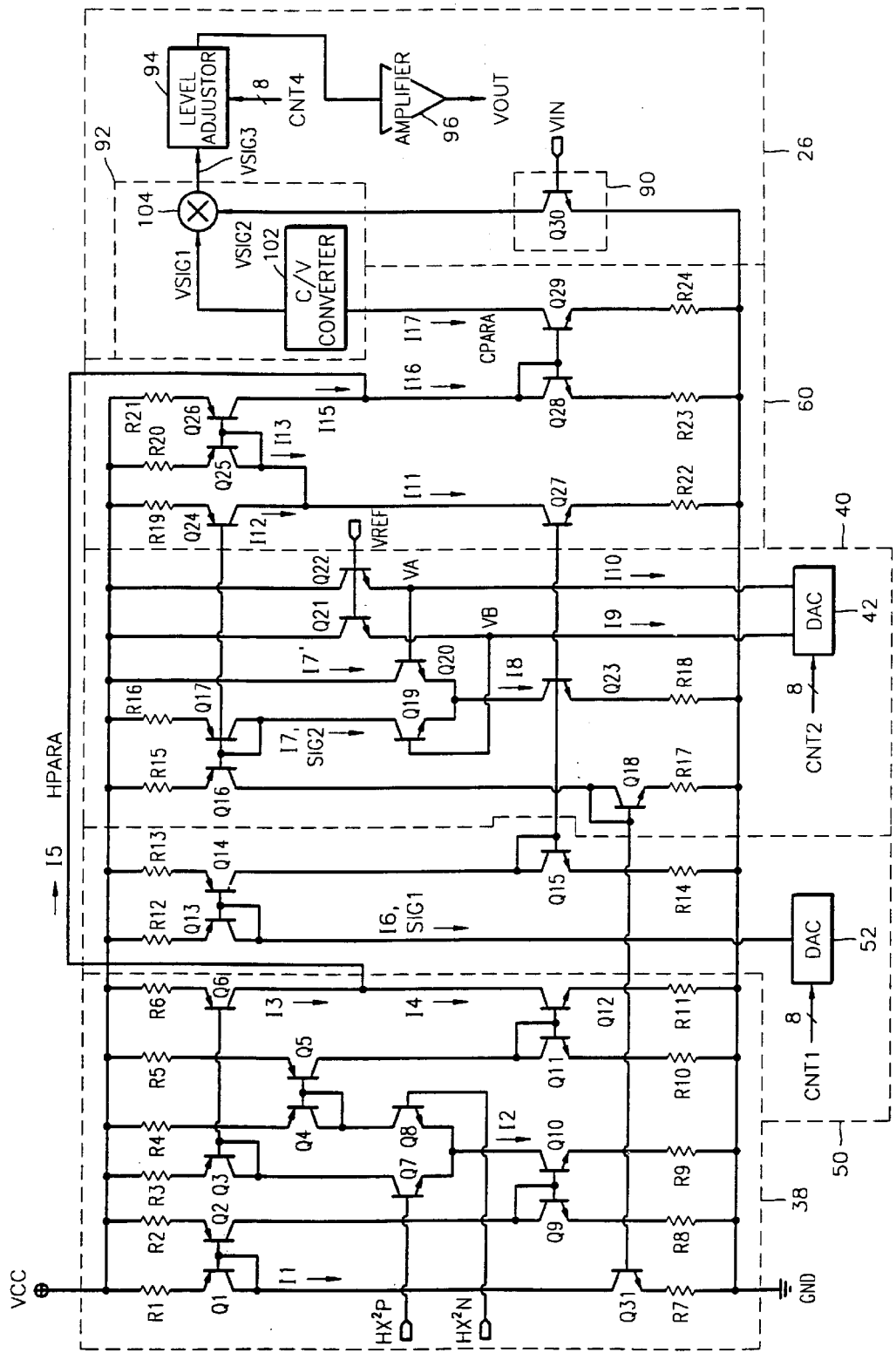
FIG. 8 is a detailed schematic circuit diagram illustrating the parabolic amplitude adjustor, level adjustors, parabolic signal synthesizer and video signal focus compensator which are part of the focus compensation apparatus of FIG. 4.

FIG. 8 is a detailed circuit diagram illustrating the parabolic amplitude adjustor 38, the level adjustors 40 and 50, the parabolic signal synthesizer 60 and the video signal focus compensator 26 which are part of the focus compensation apparatus of FIG. 4. FIG. 8 shows a focus compensation apparatus performing focus compensation for a video signal using only the horizontal parabolic signal HPARA. In this portion of the description, it is assumed that the first control signal CNT1 for controlling the level adjustor 50 is a control signal for controlling auxiliary contrast, and the fourth control signal CNT4 for controlling the level adjustor 94 is a control signal for controlling contrast.

FIGS. 9A through 9G are diagrams showing the states of current and voltage which are controlled in response to first and second control signals CNT1 and CNT2 in the level adjustors 40 and 50 of FIG. 8. FIGS. 10A through 10J are waveform diagrams of selected signals of the parabolic amplitude adjustor 38, the parabolic signal synthesizer 60 and the video signal focus compensator 26 of FIG. 8. With reference to FIGS. 8 through 10J, the operation of the focus compensation apparatus of FIG. 8 will be described in detail.

Figure 9A:
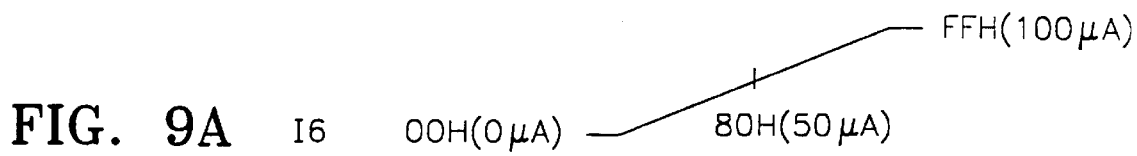

The level adjustor 50 of FIG. 8 includes transistors Q13 through Q15, resistors R12 through R14 and a digital-to-analog converter (DAC) 52. The DAC 52 converts the first control signal CNT1, which for purposes of this exemplary embodiment is an 8-bit digital signal, into an analog signal and controls the magnitude of current I6, which is generated as the first signal SIG1, in response to a result of the conversion. FIG. 9A shows a state in which the magnitude of the current I6 is increased from 0 $\mu$A to 100 $\mu$A as the first control signal CNT1 varies from 00H to FFH. Referring to FIG. 9A, when the control signal CNT1 is 80H, the magnitude of the current I6 is 50 $\mu$A. For the sake of convenience in the description, the current I6 is controlled to be 50 $\mu$A in response to the first control signal CNT1 hereinafter in this specification.

The level adjustor 40 includes transistors Q16 through Q22, resistors R15 through R18 and a DAC 42. The current I8 of the level adjustor 40 is obtained by mirroring the current I6 using a current mirror composed of transistors Q13, Q14, Q15 and Q23. The magnitude of the current I8 is determined by a ratio of the resistance of the resistor R14 to the resistance of the resistor R18 as follows:

$$I8=I6*(R14/R18).$$

For example, when the resistance of the resistor R14 is 1 K$\Omega$ and the resistance of the resistor R18 is 6.7 K$\Omega$, the magnitude of the current I8 is 7.5 $\mu$A which is about 15% of the magnitude of the current I6. For the sake of convenience in the description, the resistance of the resistor R14 is 1 KΩ and the resistance of the resistor R18 is 6.7 KΩ hereinafter in this specification.

Figure 9C:
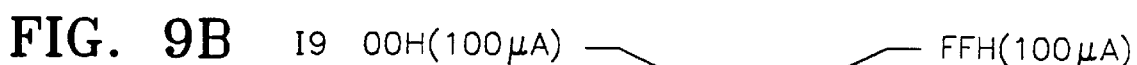
Figure 9E:
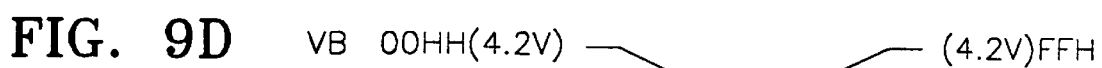

The DAC 42 of the level adjustor 40 converts the second control signal CNT2, which in this exemplary embodiment is an 8-bit digital signal, into an analog signal and controls the magnitudes of current I9 and current I10 according to a result of the conversion. FIGS. 9B and 9C show a state in which the magnitudes of the current I9 and the current I10 are controlled between 0 $\mu$A and 100 $\mu$A in response to the second control signal CNT2. Referring to FIGS. 9B and 9C, the current I9 and the current I10 are controlled in a complementary manner in response to the second control signal CNT2. In other words, the current I9 is controlled from 100 $\mu$A to 0 $\mu$A and the current I10 is controlled from 0 $\mu$A to 100 $\mu$A as the second control signal CNT2 varies from 00H to FFH. The magnitudes of voltages VB and VA which are applied to the bases of the transistors Q19 and Q20, respectively, are controlled according to the current I9 and I10 as shown in FIGS. 9D and 9E. The magnitudes of current I7 and current I7' are controlled according to the voltages VB and VA. Consequently, the magnitudes of the currents I7 and I7' are controlled according to the control signal CNT2. FIGS. 9D through 9G show a state in which the voltages VA and VB and the currents I7 and I7' are controlled in response to the second control signal CNT2.

Figure 9G:
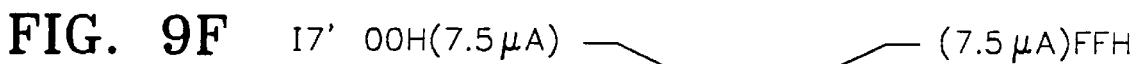

Referring to FIGS. 9F and 9G, the maximum of the currents I7' and I7 is 7.5 $\mu$A which is the magnitude of the current I8, in response to the second control signal CNT2. For example, when the second control signal CNT2 is 00H, the magnitude of the current I9 is 100 $\mu$A and the magnitude of the current I10 is 0 $\mu$A. In this case, the transistor Q20 is turned off so that the magnitude of the current I7' is 0 $\mu$A and the magnitude of the current I7 is equal to that of the current I8. On the other hand, when the second control signal CNT2 is FFH, the magnitude of the current I9 is 0 $\mu$A and the magnitude of the current I10 is 100 $\mu$A. In this case, the transistor Q19 is turned off so that the magnitude of the current I7 is 0 $\mu$A and the magnitude of the current I7' is equal to that of the current I8. Consequently, the magnitudes of the current I7 and the current I7', as shown in FIGS. 9G and 9F, are controlled within the range 0–15% (0–7.5 $\mu$A) of the current I6 according to the second control signal CNT2. For the sake of convenience, it is assumed that the magnitude of the current I7 is controlled to be 5 $\mu$A which is 10% of the current I6 according to the second control signal CNT2 hereinafter.

The parabolic amplitude adjustor 38 includes transistors Q1–Q12 and Q31 and resistors R1–R11. Current I1 of the parabolic amplitude adjustor 38 is generated by mirroring the current I7, which is the second signal SIG2, using a current mirror composed of the transistors Q17, Q16, Q18 and Q31. The current I1 is mirrored by a current mirror composed of the transistors Q1, Q2, Q9 and Q10 to generate current I2. Consequently, the current I2 is a mirror of the current I7 so that the magnitude of the current I2 is equal to that of the current I7.

The transistors Q7 and Q8 of the parabolic amplitude adjustor 38 constitute a differential amplifier. The transistor Q7 receives a non-inverted first square signal HX$^2$P, which forms a parabola between 2.45 V and 2.5 V as shown in FIG. 10A, via the base thereof. The transistor Q8 receives an inverted first square signal HX$^2$N, which forms a parabola between 2.4 V and 2.45 V as shown in FIG. 10B, via the base thereof. The non-inverted first square signal HX$^2$P and the inverted first square signal HX$^2$N are output from the multiplier 36 of FIG. 4.

The non-inverted first square signal HX$^2$P and the inverted first square signal HX$^2$N shown in FIGS. 10A and 10B, respectively, control the current flowing through the collectors of the transistors Q7 and Q8. When the non-inverted first square signal HX$^2$P is 2.5 V and the inverted first square signal HX$^2$N is 2.4 V, the collector current of the transistor Q7 is equal to the current I2 and the collector current of the transistor Q8 is 0 $\mu$A. When the non-inverted first square signal HX$^2$P and the inverted first square signal HX$^2$N are 2.45 V, the collector current of the transistor Q7 is equal to that of the transistor Q8.

The current flowing through the transistor Q7 is mirrored by a current mirror composed of the transistors Q3 and Q6 to generate current I3. The current flowing through the transistor Q8 is mirrored by a current mirror composed of the transistors Q4, Q5, Q11 and Q12 to generate current I4. Current I5 is the difference between the current I3 and the current I4, and the parabolic amplitude adjustor 38 outputs the current I5 as the horizontal parabolic signal HPARA. In other words, the current I5 is the horizontal parabolic signal HPARA, the amplitude of which is 5 $\mu$A, which is the magnitude of the current I2, as shown in FIG. 10C.

The parabolic signal synthesizer 60 includes transistors Q24 through Q29 and resistors R19 through R24. Current I12 of the parabolic signal synthesizer 60 is generated by mirroring the current I7 of the level adjustor 40 using a current mirror composed of the transistors Q17 and Q24. Accordingly, the magnitude of the current I12 is 5 $\mu$A which is the magnitude of the current I7. Current I11 is generated by mirroring the current I6 of the level adjustor 50 using a current mirror composed of the transistors Q15, Q23 and Q27. Accordingly, the magnitude of the current I11 is 50 $\mu$A which is the magnitude of the current I6. The magnitude of current I13 is 45 $\mu$A which is the difference between the current I12 (=5 $\mu$A) and the current I11 (=50 $\mu$A).

Current I15 is generated by mirroring the current I13 using a current mirror composed of the transistors Q25 and Q26. Accordingly, the magnitude of the current I15 is 45 $\mu$A which is the magnitude of the current I13, as shown in FIG. 10D. The magnitude of current I16 is the sum of the magnitude of the current I15 and the current I5 output from the parabolic amplitude adjustor 38. Current I17 is generated by mirroring the current I16 using a current mirror composed of the transistors Q28 and Q29. The current I17 as shown in FIG. 10E is the parabolic signal CPARA which is the output signal of the parabolic signal synthesizer 60. Referring to FIG. 10E, the current I17 is a signal having a parabolic shape in which the minimum is 45 $\mu$A and the maximum is 50 $\mu$A. The maximum and the minimum of the current I17 are controlled by the first and second control signals CNT1 and CNT2, respectively. Consequently, the parabolic signal synthesizer 60 outputs the parabolic signal CPARA, the waveform of which varies according to the first and second control signals CNT1 and CNT2.

The input video signal VIN as shown in FIG. 10G is applied to the base of the transistor Q30 constituting the video signal input unit 90. As shown in FIG. 10H, a fifth signal VSIG2 which can be obtained by inverting the input video signal VIN is generated at the collector of the transistor Q30. For the sake of convenience only, a white signal as shown in FIG. 10G is used as the input video signal VIN in this specification.

The focus compensator 92 includes a current-to-voltage (C/V) converter 102 and a multiplier 104. The C/V converter 102 converts the parabolic signal CPARA shown in FIG. 10E into a voltage signal. The voltage signal as shown in FIG. 10F is output to the multiplier 104 as a fourth signal VSIG1. The multiplier 104 mixes the fourth and the fifth signals VSIG1 and VSIG2 to generate a sixth signal VSIG3 as shown in FIG. 10I.

The level adjustor 94 adjusts the gain of the sixth signal VSIG3 output from the focus compensator 92 in response to the fourth control signal CNT4 to adjust contrast. The amplifier 96 inversion-amplifies a contrast adjusted signal and an inversion-amplified signal as shown in FIG. 10J is output through the output terminal VOUT as the focus-compensated video signal. Referring to FIG. 10J, the level of the focus compensated video signal increases from the center of a screen toward the edge of the screen. Accordingly, a phenomenon in which a picture is out of focus and blurred at the edge of a monitor screen can be prevented.

The parabolic amplitude adjustor 78 and the level adjustor 80 of the vertical parabolic signal generator 70 which are shown in FIG. 4 but not in FIG. 8 can be configured in the same manner as the parabolic amplitude adjustor 38 and the level adjustor 40 shown in FIG. 8.

As described above, in a focus compensation apparatus and method in a monitor system according to the present invention, the gain of an input video signal is adjusted using a parabolic signal, the level of which increases from the center of a monitor screen toward the edge of the monitor screen, thereby preventing a picture from being out of focus and blurred at the edge of the monitor screen. In addition, the waveform of the parabolic signal is automatically varied by a parabolic signal generation circuit while the gain of the input video signal is being adjusted to adjust contrast or auxiliary contrast, thereby effectively performing focus compensation at the edge of the monitor screen.

While this invention has been particularly shown and described with references to preferred embodiments thereof, it will be understood by those skilled in the art that various changes in form and details may be made therein without departing from the spirit and scope of the invention as defined by the following claims.

What is claimed is:

1. A focus compensation apparatus for adjusting a focus at the edge of a monitor screen in a monitor system, the focus compensation apparatus comprising:

a parabolic signal generation circuit for generating a parabolic signal in synchronization with a horizontal flyback pulse, the waveform of the parabolic signal varying in response to first and second control signals, the parabolic signal generation circuit comprising:

a first level adjustor for generating a first signal having a level corresponding to the first control signal, a horizontal parabolic signal generator for generating a horizontal parabolic signal in synchronization with the horizontal flyback pulse, the waveform of the horizontal parabolic signal varying in response to the first signal and the second control signal, the horizontal parabolic signal generator comprising:

a first sawtooth generator for receiving the horizontal flyback pulse and generating a first sawtooth signal synchronized with the horizontal flyback pulse, a first multiplier for receiving the first sawtooth signal and squaring a linear section of the first sawtooth signal to generate a squared signal as a first square signal, a second level adjustor for receiving the first signal, adjusting the level of the first signal in response to the second control signal, and generating a level-adjusted first signal as a second signal, and a first parabolic amplitude adjustor for receiving the first square signal, controlling the amplitude of the first square signal to be the level of the second signal, and generating an amplitude-controlled signal as the horizontal parabolic signal, and a parabolic signal synthesizer for synthesizing the first signal and the horizontal parabolic signal and generating a synthesized result as the parabolic signal for controlling the input video signal, such that the gain of the input video signal increases from the center toward the edge of the monitor screen; and a video signal focus compensator for adjusting the gain of an input video signal such that the gain increases from the center of the monitor screen toward the edge of the monitor screen in response to the parabolic signal, and for outputting a gain-adjusted video signal as a focus-compensated video signal.

2. The focus compensation apparatus of claim 1, wherein the first control signal is an auxiliary contrast control signal for achieving white balance by adjusting the contrast of red (R), green (G) and blue (B) signals constituting the input video signal.

3. The focus compensation apparatus of claim 2, wherein the video signal focus compensator adjusts the contrast of the focus-compensated video signal in response to a contrast control signal.

4. The focus compensation apparatus of claim 1, wherein the first control signal is a contrast control signal for adjusting the contrast of the input video signal.

5. The focus compensation apparatus of claim 4, wherein the video signal focus compensator adjusts the contrast of R, G and B signals constituting the focus-compensated video signal in response to an auxiliary contrast control signal.

6. The focus compensation apparatus of claim 1, wherein the parabolic signal generation circuit further comprises a vertical parabolic signal generator for generating a vertical parabolic signal in synchronization with a vertical flyback pulse, the waveform of the vertical parabolic signal varying in response to the first signal and a third control signal, wherein the parabolic signal synthesizer synthesizes the first signal, the horizontal parabolic signal and the vertical parabolic signal and generates a synthesized result as the parabolic signal.

7. The focus compensation apparatus of claim 6, wherein the vertical parabolic signal generator comprises:

a second sawtooth generator for receiving the vertical flyback pulse and generating a second sawtooth signal synchronized with the vertical flyback pulse;

a second multiplier for receiving the second sawtooth signal and squaring a linear section of the second sawtooth signal to generate a squared signal as a second square signal;

a third level adjustor for receiving the first signal, adjusting the level of the first signal in response to the third control signal, and generating a level-adjusted first signal as a third signal; and a second parabolic amplitude adjustor for receiving the second square signal, controlling the amplitude of the second square signal to be the level of the third signal, and generating an amplitude-controlled signal as the vertical parabolic signal.

8. A focus compensation method for adjusting a focus at the edge of a monitor screen in a monitor system, the focus compensation method comprising the steps of:

(a) generating a first signal having a level corresponding to a first control signal;

(b) generating a horizontal parabolic signal in synchronization with a horizontal flyback pulse, the waveform of the horizontal parabolic signal varying in response to the first signal and a second control signal, comprising the steps of:
  (b1) generating a first sawtooth signal synchronized with the horizontal flyback pulse,
  (b2) generating a first square signal by squaring a linear section of the first sawtooth signal,
  (b3) adjusting the level of the first signal according to the second control signal and generating a level-adjusted first signal as a second signal, and
  (b4) controlling the amplitude of the first square signal to be the level of the second signal and generating an amplitude-controlled signal as the horizontal parabolic signal;
(c) synthesizing the first signal and the horizontal parabolic signal to generate a parabolic signal, the level of the parabolic signal increasing from the center of the monitor screen toward the edge of the monitor screen; and
(d) performing focus compensation such that the gain of the input video signal increases from the center of the monitor screen toward the edge of the monitor screen by adjusting the gain of the input video signal according to the parabolic signal.

9. The focus compensation method of claim 8, wherein the first control signal is an auxiliary contrast control signal for achieving white balance by adjusting the contrast of red (R), green (G) and blue (B) signals constituting the input video signal.

10. The focus compensation method of claim 8, wherein the first control signal is a contrast control signal for adjusting the contrast of the input video signal.

11. The focus compensation method of claim 8, further comprising the step of (e) generating a vertical parabolic signal in synchronization with a vertical flyback pulse after step (b), the waveform of the vertical parabolic signal varying in response to the first signal and a third control signal,
  wherein step (c) comprises the step of synthesizing the first signal, the horizontal parabolic signal and the vertical parabolic signal and generating a synthesized result as the parabolic signal.

12. The focus compensation method of claim 11, wherein step (e) comprises the steps of:
  (e1) generating a second sawtooth signal synchronized with the vertical flyback pulse;
  (e2) generating a second square signal by squaring a linear section of the second sawtooth signal;
  (e3) adjusting the level of the first signal according to the third control signal and generating a level-adjusted first signal as a third signal; and
  (e4) controlling the amplitude of the second square signal to be the level of the third signal and generating an amplitude-controlled signal as the vertical parabolic signal.

13. A parabolic signal generator for generating a parabolic signal for adjusting the focus of an input video signal in a monitor system, the parabolic signal generator comprising:
  a sawtooth generator for receiving a pulse signal and generating a sawtooth signal synchronized with the pulse signal;
  a multiplier for receiving the sawtooth signal and squaring a linear section of the sawtooth signal to generate a square signal;
  a level adjustor for receiving a first signal having a level corresponding to a first control signal, adjusting the level of the first signal in response to a second control signal, and generating a level-adjusted first signal as a second signal;
  a parabolic amplitude adjustor for receiving the square signal and performing amplitude control such that the level of the second signal is equal to the amplitude of the square signal to generate an amplitude-controlled square signal; and
  a parabolic signal synthesizer for synthesizing the first signal and the amplitude-controlled square signal and generating a synthesized signal as a parabolic signal.

14. The parabolic signal generator of claim 13, wherein the first control signal is an auxiliary contrast control signal for achieving white balance by adjusting the contrast of red (R), green (G) and blue (B) signals constituting the input video signal.

15. The parabolic signal generator of claim 13, wherein the first control signal is a contrast control signal for adjusting the contrast of the input video signal.

16. A focus compensation apparatus for adjusting a focus at the edge of a monitor screen in a monitor system, the focus compensation apparatus comprising:
  a parabolic signal generation circuit for generating a parabolic signal in synchronization with a horizontal flyback pulse, the waveform of the parabolic signal varying in response to first and second control signals, the parabolic signal generation circuit comprising a vertical parabolic signal generator for generating a vertical parabolic signal in synchronization with a vertical flyback pulse, the waveform of the vertical parabolic signal varying in response to the first signal and a third control signal, wherein the parabolic signal synthesizer synthesizes the first signal, the horizontal parabolic signal and the vertical parabolic signal and generates a synthesized result as the parabolic signal, the vertical parabolic signal generator comprising:
  a second sawtooth generator for receiving the vertical flyback pulse and generating a second sawtooth signal synchronized with the vertical flyback pulse;
  a second multiplier for receiving the second sawtooth signal and squaring a linear section of the second sawtooth signal to generate a squared signal as a second square signal;
  a third level adjustor for receiving the first signal, adjusting the level of the first signal in response to the third control signal, and generating a level-adjusted first signal as a third signal; and
  a second parabolic amplitude adjustor for receiving the second square signal, controlling the amplitude of the second square signal to be the level of the third signal, and generating an amplitude-controlled signal as the vertical parabolic signal; and
  a video signal focus compensator for adjusting the gain of an input video signal such that the gain increases from the center of the monitor screen toward the edge of the monitor screen in response to the parabolic signal, and for outputting a gain-adjusted video signal as a focus-compensated video signal.

17. A focus compensation method for adjusting a focus at the edge of a monitor screen in a monitor system, the focus compensation method comprising the steps of:
  (a) generating a first signal having a level corresponding to a first control signal;
  (b) generating a horizontal parabolic signal in synchronization with a horizontal flyback pulse, the waveform of the horizontal parabolic signal varying in response to the first signal and a second control signal;

(c) synthesizing the first signal and the horizontal parabolic signal to generate a parabolic signal, the level of the parabolic signal increasing from the center of the monitor screen toward the edge of the monitor screen;

(d) performing focus compensation such that the gain of the input video signal increases from the center of the monitor screen toward the edge of the monitor screen by adjusting the gain of the input video signal according to the parabolic signal; and (e) generating a vertical parabolic signal in synchronization with a vertical flyback pulse after step (b), the waveform of the vertical parabolic signal varying in response to the first signal and a third control signal, wherein step (c) comprises the step of synthesizing the first signal, the horizontal parabolic signal and the vertical parabolic signal and generating a synthesized result as the parabolic signal; and step (e) comprises the steps of:

(e1) generating a second sawtooth signal synchronized with the vertical flyback pulse;

(e2) generating a second square signal by squaring a linear section of the second sawtooth signal;

(e3) adjusting the level of the first signal according to the third control signal and generating a level-adjusted first signal as a third signal; and (e4) controlling the amplitude of the second square signal to be the level of the third signal and generating an amplitude-controlled signal as the vertical parabolic signal.

* * * * *